Jan. 7, 1947.   H. J. HEPP   2,413,871
PROCESS OF REMOVING ORGANICALLY COMBINED CHLORINE FROM HYDROCARBONS
Filed July 24, 1945
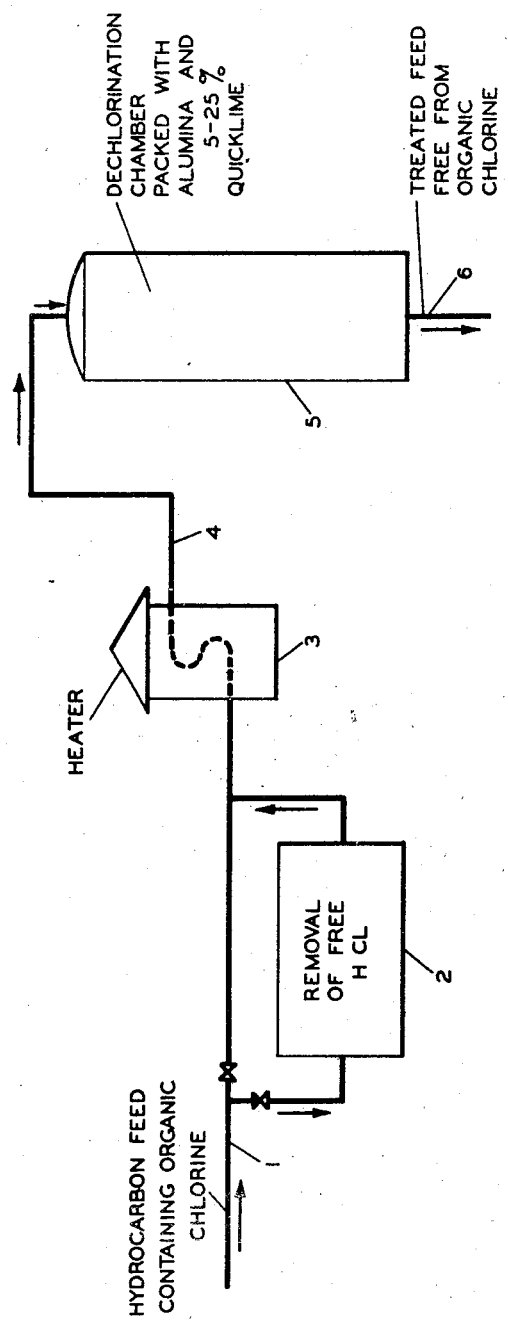
INVENTOR.
H.J. HEPP
BY Hudson & Young
ATTORNEYS.

Patented Jan. 7, 1947

2,413,871

UNITED STATES PATENT OFFICE 2,413,871

PROCESS OF REMOVING ORGANICALLY COMBINED CHLORINE FROM HYDROCARBONS

Harold J. Hepp, Bartlesville, Okla., assignor to Phillips Petroleum Company, a corporation of Delaware Application July 24, 1945, Serial No. 606,867

16 Claims. (Cl. 196—36)

This invention relates to a process for the removal of organically combined chlorine from hydrocarbons and more particularly to an improved method of effecting such removal.

The principal object of the present invention is to provide an improved method of removing organically combined chlorine from hydrocarbons. Another object is to effect this removal more simply, more economically and more effectively than by previously proposed processes. Another object is to effect an improvement in the art of removal of organic chlorine by means of bauxite as a catalyst. It is an object of this invention to provide a process for the removal of organically combined chlorine from hydrocarbons in which the catalyst retains high dechlorination activity over periods of treatment previously unattained. It is another object of this invention to provide a catalyst for such a process comprising alumina in a suitably active form such as bauxite admixed and/or impregnated with quicklime, which is characterized by an exceedingly long life at a high level of activity. Many other objects will hereinafter become apparent to those skilled in the art.

The accompanying drawing portrays diagrammatically an arrangement of equipment which may be employed for carrying out the process of this invention.

The gasoline boiling-range products obtained in the catalytic conversion of hydrocarbons with aluminum chloride or other metal chloride catalysts frequently contain small amounts of 0.2 weight per cent or less of chlorine which is not removable by a water or caustic wash. Such organically bound chlorine, if not removed, leads to corrosion of engine parts and to decreased TEL response when such products are used as fuels for internal combustion engines.

The partial removal of alkyl chlorides from distillates with an initial boiling point of below 300° F. by subjecting them to a temperature of over 300° F. for a period of time sufficient to decompose such chlorine-containing organic compounds in the absence of catalysts, and also in the presence of solid or substantially solid catalysts which (a) combine with said combined chlorine, (b) decompose said chlorine-containing organic compounds and (c) combine with said combined chlorine to form materials capable of effecting the decomposition of further quantities of said organic chlorine compounds, has been described (Shiffler et al., U. S. 1,869,781). The catalysts mentioned are pumice, bauxite, pure aluminum oxide, coke, quartz, glass, inert silicates and chlorides of iron, zinc, barium, cobalt, and copper. Also ferrous sulfide, lime, zinc, iron, copper, and aluminum are mentioned.

Such catalysts have greater or lesser ability to effect the decomposition of alkyl chlorides. Thus, I have found that when an alkylate rich in diisopropyl and containing 0.01 weight per cent of organically combined chlorine was passed over bauxite at 80 p. s. i. g. and 700° F. at a space velocity of 5 liquid volumes per volume of catalyst per hour, an initial removal of as much as 90 per cent of the alkyl chlorides was effected. However, conversion dropped to approximately 80 per cent after 10 hours and averaged only about 70 per cent after an additional 100 hours.

Silica-alumina gel-type catalyst (for example, prepared in accordance with McKinney, U. S. 2,142,324) was also shown to possess good initial activity, but gradually lost activity with increased running time.

Calcium chloride, limestone, zinc oxide, Harshaw "Puralox" pellets ($Al_2O_3$) and titanium dioxide had little activity at temperatures in the range of 500 to 685° F. However, iron oxide effected about 50 per cent removal of combined chlorine.

However, I have now discovered that the high level of activity initially exhibited by alumina in a suitably active form such as bauxite can be maintained over long periods of time by use of the bauxite in admixture and/or impregnated with quicklime.

In accordance with my invention, removal of the organically combined chlorine from the hydrocarbon is accomplished by subjecting the hydrocarbon containing a minor quantity of organically combined chlorine to the action of a mixture of alumina in a suitably active form such as bauxite, preferably dehydrated, and quicklime at a reaction temperature and for a time such that extensive chemical changes in the hydrocarbon itself are not effected but such that a major proportion and generally at least 65% of the organic chlorine is decomposed. The reaction temperature is sufficiently elevated and the time of contact and other conditions are such as to effect decomposition of the organic chlorine compounds forming hydrogen chloride.

The alumina should be in a catalytically active form. Ordinarily the alumina will be employed in a porous highly adsorptive form. Examples are activated alumina, alumina gel, the material known in the trade as "Porocel" which is sold by Porocel Corporation of Philadelphia, Penn., dehydrated bauxite, etc. Selection of a suitable alumina for use in carrying out the present invention will be well within the skill of the art. In general, the alumina should be characterized by high adsorptive power, a high surface area and a highly extended surface, suitable hardness to resist crumbling during handling and use, and suitable size and granular form. As will be obvious, alumina in the non-porous form possessed by corundum, Alundum, or aloxite, is not desirable for use in the practice of my invention. The alumina used should be dehydrated as later described.

The process of dechlorination may be carried out either in liquid or vapor phase. It is preferable that the process be carried out in vapor phase at atmospheric or somewhat higher pressure, say up to 100 p. s. i. g. The temperature of operation of this process is between 300° F. and 900° F., preferably in the range of 600 to 800° F.

In practicing my invention, it is preferable to use a feed substantially free of HCl, i. e., which does not contain more than 0.01 per cent by weight of HCl. If the hydrocarbon to be treated does contain HCl, it is preferable to remove substantially all the HCl prior to treatment with bauxite and quicklime in accordance with my invention. Any suitable method of removing the HCl may be employed, such as caustic washing. The process of dechlorination may be carried out continuously in an apparatus consisting of a heater and a reaction chamber. The feed is heated to the desired temperature and conducted to the reaction chamber containing a catalyst. From the reaction chamber, the treated material is conducted to any desired subsequent treatment. Various types of heaters and reaction chambers and heat exchanger combinations will occur to those skilled in the art. The preferred operating conditions are: temperature, 600 to 800° F.; pressure, 15 to 100 p. s. i. g.; flow rate, 1 to 10 gallons of liquid hydrocarbon per gallon of catalyst per hour. The catalyst preferably does not exceed 25 weight per cent quicklime. Preferably the catalyst contains at least 5 weight per cent of quicklime.

The prior art contains discussions of the mechanics of the dechlorination reaction carried out by means of the same general nature as just discussed. It has been observed that HCl is found in the decomposition of the organic chlorides; and in the case of an alkyl chloride, it is believed that the products of this decomposition are an olefin and HCl.

In using a catalyst such as bauxite, in the early life of the catalyst, substantially no HCl appears in the treated hydrocarbon as it comes from the reaction chamber. Later in the life of the catalyst, however, HCl does appear in the hydrocarbon effluent in detectable quantities. The organically-combined chlorine content of the effluent hydrocarbon is lower during that period of operation in which substantially no HCl is found in the effluent from the reaction chamber than in the subsequent period when HCl is found. However, when quicklime is added to bauxite and the mixture used as the catalyst, the HCl formed in the decomposition appears to react, at least in part, with the quicklime and produces a catalyst which displays activity in dechlorination over long periods of operation approximately equal to the maximum activity of fresh bauxite, whereas the activity of bauxite alone rapidly declines to a comparatively low level.

The calcium chloride formed in situ during treatment with a quicklime-bauxite mixture appears to be a highly active form, possibly due to some promoting action of the bauxite.

The bauxite and quicklime should be intimately admixed with one another. Usually the powdered or granular quicklime will be simply admixed with the granular bauxite in such manner as to give a uniform mixture. The bauxite may be of any suitable size such as to give a desirably low pressure drop and at the same time attain the desired intimacy of contact of the hydrocarbon stream undergoing treatment with the bauxite and a suitably high utilization of the bauxite. Mesh sizes of 8 to 30 are usually satisfactory. The quicklime may be in lump form of a particle size comparable with that stated for the bauxite or may be in the form of a relatively fine material ranging from one-quarter inch down to an impalpable powder. Ordinarily the quicklime is rather finely powdered so that it adheres well to the surfaces of the bauxite lumps or granules. Instead of being simply admixed with the bauxite the quicklime may be impregnated onto the bauxite by any suitable method, for example, by suspending the quicklime in a suitable anhydrous medium such as a volatile organic solvent, impregnating the granular or lump bauxite with the resulting suspension, and drying to drive off the solvent. Any other method of effecting impregnation of the bauxite with the quicklime, whether known or obvious now or discovered in the future may be employed.

While the bauxite and quicklime may be arranged as alternate layers, it has been found by actual plant operation that this is much less preferable to an intimate mixture because of a tendency to rapidly build up an excessive pressure drop. Where the bauxite is in admixture with the quicklime this objection does not arise.

The hydrocarbon containing organic chlorine treated in accordance with the present invention may be obtained from any source. Usually it will be obtained from a hydrocarbon conversion wherein a metal chloride-containing catalyst and/or promoter is employed, especially an aluminum chloride catalyst promoted with hydrogen chloride. The problem of removing organic chlorine occurs most commonly in the case of alkylation of isoparaffins with olefins especially alkylation of isobutane with an ethylene concentrate to give diisopropyl using an aluminum chloride-containing catalyst promoted with hydrogen chloride. However, the process of the present invention is applicable to hydrocarbons produced by other conversions, including isomerization, polymerization, dehydrochlorination, etc., or any other conversion which yields a hydrocarbon effluent containing organically combined chlorine. The hydrocarbon treated in accordance with the present invention may have acquired its organic chlorine content as a result of a treatment as distinguished from a conversion.

The hydrocarbon feed treated in accordance with this invention ordinarily contains from 0.01 to 0.2 weight per cent of organic chlorine measured as chlorine. Occasionally, however, the organic chlorine content may be greater than 0.2 weight per cent, but this may still be advantageously processed in accordance with the present invention.

The treatment of the present invention effects decomposition of a major proportion and usually at least 65% of the organic chlorine compounds. The dechlorination efficiency of the present invention usually is considerably higher than this figure commonly being at least 85% and often running as high as 95%.

If desired the hydrocarbon material which has been treated with bauxite and quicklime in accordance with the present invention may optionally be after-treated for removal of free HCl if it be present therein. This may be accomplished in any suitable manner as by a caustic wash or by fractionation to recover a light fraction containing unreacted hydrocarbons and free HCl which may be recycled to the alkylation or other conversion unit.

The hydrocarbon feed to the process of the present invention should be substantially free of water, although traces of water are not particularly harmful. Excessive amounts of water may lead to severe corrosion of vessels and lines.

Likewise, the bauxite used in the dechlorination catalyst mixture should contain substantially no free water. Preferably the bauxite employed has been dehydrated in known manner to drive off free or adsorbed water. The dehydration of the bauxite should be carried out below about 1700° F. in order to avoid injuring its catalytic activity, the details of this step being well known in the art. I find it quite satisfactory to dehydrate at temperatures between 1000° F. and 1500° F. This dehydration step may be carried out, however, by other known and somewhat varied procedures with satisfactory results. If, between the dehydration step and the time of introduction of the bauxite-quicklime catalyst into the catalyst chamber, the bauxite adsorbs water from the atmosphere, I find it a good practice to dry the catalyst in the chamber in a stream of substantially dry, neutral gas at temperatures of about that used in the dechlorination process or higher. I find it convenient to use activated bauxite of commerce such as the material known in the trade as "Porocel."

The hydrocarbon feed to the dechlorination step of the present invention may, of course, have been subjected to fractionation to remove light material, such as depropanization, debutanization, etc. Alternatively, the entire conversion effluent may be dechlorinated by the present invention and the so treated effluent subjected to steps for the removal of light gases, such as butane, propane, or material lighter than propane.

Referring to the drawing, the dehydrated hydrocarbon feed containing organically combined chlorine enters via line 1. If free HCl is present in the feed it is removed in unit 2. The feed is preheated in heater 3 to the treating temperature and thence fed via line 4 through dechlorination chamber 5. The treated effluent leaves via line 6.

The following examples show the improved result obtained by the practice of my invention. It is not, however, to be interpreted to place any limitations on the scope of the invention.

*Example I*

In this run, the catalyst was 10 weight per cent quicklime and 90 weight per cent bauxite. This catalyst was prepared by mixing thoroughly the bauxite and finely powdered quicklime. The charge was the product of an olefin-isobutane alkylation, wherein isobutane was alkylated with an ethylene concentrate with a liquid aluminum chloride complex catalyst promoted with HCl, and contained 0.107 weight per cent organically combined chlorine. The charge was continuously pumped to a heater and passed to a reaction chamber containing the catalyst at the rate of approximately five liquid volumes per volume of catalyst per hour. The temperature of the reaction chamber was maintained at 700° F., and the pressure maintained at 15 pounds per square inch gage. The reactor effluent was cooled and condensed in a water-jacketed condenser. The decomposition of organic chlorides remained substantially constant at about 94 per cent over the 24-hour period of the run, the catalyst having treated 115 volumes of charge stock. The catalyst retained its activity all through the run, and was not spent at the time the run was shut down.

In a second run in the same apparatus, an ethylene-isobutane alkylate containing 0.144 weight per cent chlorine was dechlorinated using bauxite alone. The conditions were 700° F. and 80 p. s. i. g. For the first thirteen hours of the run, the flow rate was five liquid volumes of hydrocarbon per volume of catalyst per hour. For the first six hours, the decomposition of organic chloride was 90 per cent, and at the end of 9 hours the decomposition was 68 per cent. At the end of thirteen hours, the flow rate was reduced to three liquid volumes per hour in an attempt to improve the dechlorination. At the end of 24 hours total operation the activity had leveled off to approximately 50 per cent decomposition of the organic chloride.

*Example II*

A mechanical mixture of 7 per cent by weight of quicklime and 93 per cent by weight bauxite was used as a dechlorination catalyst for an ethylene-isobutane alkylate containing organically combined chlorine in the range of 0.01 to 0.03 weight per cent. The space velocity during this run was 3 to 5 volumes per volume of catalyst per hour, the temperature about 700° F., and the pressure about 50 p. s. i. g. The initial decomposition of organically combined chlorine was 90 per cent, HCl appearing in the effluent after 24 hours operation. After a week of operation, the conversion was at the 90–95 per cent level; and after three months, the conversion was still 85–95 per cent.

This result compared with previously-cited data shows the great improvement of my invention.

To further illustrate my invention, the following comparative examples are offered:

Calcium chloride was tested at temperatures of 500° F. to 650° F. at a flow rate of 5 liquid volumes of hydrocarbon per volume of catalyst per hour and 15 p. s. i. g. The charge was an ethylene-isobutane alkylate containing 0.183 weight per cent organically combined chlorine. Substantially no removal of chlorine was effected.

Limestone was used in another test with the same hydrocarbon charge and at substantially the same conditions, again substantially no removal being effected.

Zinc oxide at these conditions and with the same charge effected 15 to 25 per cent removal of the chlorine.

Dehydrated limonite at these conditions and with the same feed stock effected about 50 per cent removal of chlorine.

While specific details of the preferred mode of operation have been given in the foregoing for purposes of illustration, it is to be understood that the invention is not limited thereby but is to be taken as limited solely by the language of the appended claims.

I claim:

1. The process of removing organically combined chlorine from hydrocarbons which comprises treating said hydrocarbon with a mixture of alumina and quicklime under conditions such as to effect decomposition of at least a major proportion of the organic chlorine compounds to form hydrogen chloride and combination of said hydrogen chloride with said quicklime and such that extensive chemical changes in said hydrocarbon are not effected.

2. The process of removing organically combined chlorine from hydrocarbons which comprises treating said hydrocarbon with a mixture of alumina and quicklime, carrying out said treatment at an elevated temperature and under other conditions such as to effect decomposition of the organic chlorine compounds forming hydrogen chloride and combination of said hydrogen chloride with said quicklime and such that extensive chemical changes in said hydrocarbon are not effected.

3. The process of removing organically combined chlorine from hydrocarbons which comprises treating said hydrocarbon with a mixture of alumina and quicklime, said mixture containing between approximately 5 and approximately 25 per cent of quicklime, at an elevated temperature and under other conditions such as to effect decomposition of the organic chlorine compounds forming hydrogen chloride and combination of said hydrogen chloride with said quicklime and such that extensive chemical changes in said hydrocarbon are not effected.

4. The process of removing organically combined chlorine from hydrocarbons which comprises treating said hydrocarbon with a contact mass composed of a mixture of alumina and quicklime, carrying out said treatment at a temperature of from 300 to 900° F. and under other conditions such as to effect decomposition of the organic chlorine compounds forming hydrogen chloride and combination of said hydrogen chloride with said quicklime and such that extensive chemical changes in said hydrocarbon are not effected.

5. The process of removing organically combined chlorine from hydrocarbons which comprises treating said hydrocarbon in the vapor phase with a contact mass composed of a physical mixture of adsorptive anhydrous alumina and free quicklime, said mixture containing between approximately 5 and approximately 25 per cent of quicklime by weight based on the weight of the mixture, at a temperature of from 600 to 800° F., at a pressure ranging from atmospheric to 100 pounds per square inch gage and under other conditions such as to effect decomposition of at least 85 per cent of the organic chlorine compounds forming hydrogen chloride and combination of said hydrogen chloride with said quicklime and such that extensive chemical changes in said hydrocarbon are not effected.

6. The process of claim 5 wherein said treatment is conducted by passing the hydrocarbon in vapor phase through a bed of said contact mass at a space velocity of 1 to 10 liquid volumes of hydrocarbon per gallon of contact mass per hour.

7. The process of claim 1 wherein said alumina is dehydrated bauxite.

8. The process of claim 2 wherein said alumina is dehydrated bauxite.

9. The process of claim 3 wherein said alumina is dehydrated bauxite.

10. The process of claim 4 wherein said alumina is dehydrated bauxite.

11. The process of claim 5 wherein said alumina is dehydrated bauxite.

12. The process of claim 1 wherein said alumina is Activated Alumina.

13. The process of claim 2 wherein said alumina is Activated Alumina.

14. The process of claim 3 wherein said alumina is Activated Alumina.

15. The process of claim 4 wherein said alumina is Activated Alumina.

16. The process of claim 5 wherein said alumina is Activated Alumina.

HAROLD J. HEPP.